(12) United States Patent
Cha et al.

(10) Patent No.: US 7,655,267 B2
(45) Date of Patent: Feb. 2, 2010

(54) GUM APPLICATION IN WHEYLESS CREAM CHEESE SYSTEMS

(75) Inventors: Alice Shen Cha, Northbrook, IL (US); Jimbay P. Loh, Green Oaks, IL (US); Ana Patricia Rodriguez, Gurnee, IL (US)

(73) Assignee: Kraft Foods Global Brands LLC, Northfield, IL (US)

( * ) Notice: Subject to any disclaimer, the term of this patent is extended or adjusted under 35 U.S.C. 154(b) by 682 days.

(21) Appl. No.: 11/053,060

(22) Filed: Feb. 8, 2005

(65) Prior Publication Data

US 2005/0136168 A1 Jun. 23, 2005

Related U.S. Application Data

(63) Continuation of application No. 10/210,851, filed on Aug. 1, 2002, now Pat. No. 6,913,774.

(51) Int. Cl.
*A23C 19/00* (2006.01)

(52) U.S. Cl. ............... 426/582; 426/34; 426/36; 426/519; 426/520; 426/573; 426/580

(58) Field of Classification Search ............ 426/34, 426/36, 38, 39, 42, 43, 573, 575, 576, 577, 426/580, 582, 519, 520, 521, 522
See application file for complete search history.

(56) References Cited

U.S. PATENT DOCUMENTS

| | | |
|---|---|---|
| 3,749,583 A | 7/1973 | Cox et al. |
| 3,929,892 A | 12/1975 | Hynes et al. |
| 4,324,804 A | 4/1982 | Davis |
| 4,397,878 A | 8/1983 | Koide et al. |
| 4,534,982 A | 8/1985 | Yoshida et al. |
| 4,597,971 A | 7/1986 | Davis |
| 5,079,024 A | 1/1992 | Crane |
| 5,108,773 A | 4/1992 | Smith et al. |
| 5,180,604 A | 1/1993 | Crane et al. |
| 5,882,704 A | 3/1999 | Yamaguchi et al. |
| 6,322,841 B1 | 11/2001 | Jackson et al. |
| 6,416,797 B1 | 7/2002 | Han et al. |

FOREIGN PATENT DOCUMENTS

| | | |
|---|---|---|
| DE | 195 28 936 | 2/1997 |
| DE | 195 28 936 A1 | 2/1997 |
| EP | 0 526 086 A1 | 2/1993 |
| GB | 891098 | 3/1962 |

*Primary Examiner*—Leslie Wong
(74) *Attorney, Agent, or Firm*—Fitch, Even, Tabin & Flannery

(57) ABSTRACT

The present invention describes processes that incorporate ionic gums into wheyless cream cheese to reinforce curd structure, thus increasing product firmness. The processes involve adding a relatively small (e.g., about 0.005 to about 0.1 percent) but effective amount of the ionic gum (e.g., xanthan, gellan, carrageenan, alginate gums, low methoxy pectin, or mixtures thereof) before a fermentation step, preferably prior to initial homogenization/heating steps, to provide ionic gum-dairy protein interaction without causing coacervation with protein. In certain preferred embodiments, xanthan gum is used due to its cold water solubility, consistent composition, availability, and low cost.

7 Claims, 2 Drawing Sheets

GUM APPLICATION IN WHEYLESS CREAM CHEESE SYSTEMS

CROSS-REFERENCE TO RELATED APPLICATION

This application is a continuation of prior application Ser. No. 10/210,851, filed Aug. 1, 2002, now U.S. Pat. No. 6,913,774 which is hereby incorporated herein by reference in its entirety.

FIELD OF THE INVENTION

The invention relates to the production of cream cheese. More specifically, the invention relates to methods for producing improved wheyless cream cheese by adding ionic gums.

BACKGROUND

Cheese compositions are generally prepared from dairy liquids by processes that include treating the liquid with a coagulating or clotting agent. The coagulating agent may be a curding enzyme, an acid, or a suitable bacterial culture. The coagulum or curd that results generally incorporates transformed casein, fats (including natural butter fat), and flavorings (especially those arising when bacterial cultures are used). The curd is usually separated from the whey and is then collected. The resulting liquid whey generally contains substantial portions of nutrients, including soluble proteins, mineral salts, and lactose. Normally these nutrients are lost in the manufacturing process. This inability of whey nutrients to be retained in the coagulum is an important factor contributing to inefficiencies in production of cheese curds, and to reductions in overall yield of protein solids from the starting dairy liquids. Therefore, there remains a need for more effective methods of improving the efficiency of nutrient incorporation during cheese production.

Cream cheese is an acidic (pH less than about 5), cultured or direct acidified, uncured cheese made of dairy components including a fat source (e.g., a mixture of cream and milk). Production of cream cheese normally produces whey which results in both nutrient loss and product inefficiencies similar to natural cheese production methods. Cream cheese is normally stored under refrigeration conditions (i.e., about 35 to about 45° F.) and typically has a smooth and butterlike body. At refrigeration temperatures, cream cheese can normally be sliced, but it is not soft or readily spreadable and cannot readily be applied to a soft or brittle substrate.

Texture modifiers or stabilizers such as neutral and/or non-ionic gums are commonly added during cream cheese processing after a culturing step to enhance the texture and creaminess and/or to control syneresis. The use of ionic gums in cream cheese processing before culturing or acidification as texture modifiers or stabilizers is not know in the art because of the tendency to develop texture defects (e.g., increased syneresis, grainy texture, etc.). The negative effect of such texture modifiers or stabilizer on cream cheese is though to arise by coacervation between the negatively charged gums (e.g., carrageenan) and positively charged proteins (e.g., casein).

Attempts have been made to develop processes for making wheyless cream cheese in which nutrients traditionally lost in the whey are retained in the cheese product. Ionic gums have been used for producing non-fat cream cheese-like products by added to preformed cheese curd. U.S. Pat. No. 5,180,604 (Jan. 19, 1993) relates to the production of a non-fat cream cheese using a two gum stabilizing system. Dry cottage cheese curd and emulsifying salts are added to a fermented skim milk retentate which is then heated with agitated to elevated temperatures. Non-fat dry milk is added at temperature of about 70 to about 150° F.; followed by xanthan gum at a temperature of about 140 to about 165° F.; finally carrageenan is added once the temperature reaches about 190° F. U.S. Pat. No. 5,882,704 (Mar. 16, 1999) provides a wheyless process for the production of cream cheese-like products. Stabilizers (e.g., locust bean gum, guar gum, xanthan gum, gum arabic, and the like) are added after fermentation.

U.S. Pat. No. 5,108,773 (Apr. 28, 1992) provides a process for the production of a non-fat cream cheese product. Generally, the method includes combining a concentrated skim milk source with microcrystalline cellulose and subjecting the mixture to a microfluidizing treatment. The treated mixture is combined with skim milk curd and various gums in a series of steps to produce a non-fat cream cheese product that resembles a reduced fat or full fat cream cheese in texture, taste and mouthfeel. Gums used include xanthan, carrageenan, guar gum, carob bean gum, alginic acid and sodium and calcium salts thereof, gum arabic, gum tragacanth, carboxymethyl cellulose, and pectin.

Ionic gums have also been used to form dairy based gel products. U.S. Pat. No. 5,079,024 (Jan. 7, 1992) provides a method for making a non-fat process cream cheese product. A source of concentrated skim milk is heated with agitated to a first predetermined elevated temperature. An emulsifier salt is then added to the skim milk. After reaching the first predetermined elevated temperature, a first gum is added to the heated skim milk in the second mixer to provide a thickened skim milk. The thickened skim milk is then homogenized in a first homogenizing step, after which a bulking agent and a second gum are. The resulting homogenized, thickened skim milk is heated with agitated to a second predetermined temperature to provide a non-fat cream cheese precursor. The non-fat cream cheese precursor is then homogenized to provide a non-fat cream cheese type product. The first gum includes xanthan, guar gum, agar, carrageenan, gum arabic, gum tragacanth, alginates, locust bean gum, carboxymethyl cellulose, pectin, starches, modified starches, and mixtures thereof. The second gum includes xanthan, guar gum, agar, carrageenan, gum arabic, gum tragacanth, alginates, locust bean gum, carboxymethyl cellulose, pectins, starches, modified starches, and mixtures thereof. U.S. Pat. No. 6,322,841 (Nov. 27, 2001) describes a simplified process to make a cheese-like dairy gel from gums, starch, and dairy fluid which stimulates the texture of cream cheese.

However, cheese or cheese-like products produced by such processes typically do not have the body, texture, and/or taste desired in cream cheese. Therefore, there remains a need to develop processes for making cream cheese in which the cheese has body, texture, and taste similar to that found in cream cheese prepared by conventional processes (i.e., curds and whey processes). The current invention meets such long-standing needs in the art. For example, the current invention provides processes for producing cream cheese which result in significant productivity savings. Furthermore, the current invention provides processes for preparing wheyless cheese having improved firmness and the texture, body, and taste of conventional cream cheese. Finally, the current invention provides processes for producing cream cheese in which whey nutrients are not lost in the process.

SUMMARY OF THE INVENTION

The current invention provides processes for making cream cheese which provide significant productivity savings by incorporating gums to strengthen the curd thereby allowing a reduction in solids such as protein and/or fats while maintaining desirable organoleptic properties. Furthermore, the current invention includes a process for making cream cheese wherein the resulting cream cheese has the body, texture, and taste of conventional cream cheese yet wherein nutrients typically lost as whey during processing are maintained and utilized in the final cream cheese. The present invention provides processes that incorporate ionic gums into wheyless, acidic dairy products (especially cream cheese products) prior to culturing or acidification to reinforce curd structure, thus increasing product firmness. The processes involve adding a relatively small (e.g., about 0.001 to about 0.1 percent) but effective amount of an ionic gum (e.g., xanthan, gellan, carrageenan, alginate, low methoxy pectin, and mixtures thereof) before fermentation or acidification, preferably prior to the initial homogenization and/or heating steps. For purposes of this invention, an "effective amount" of ionic gum to be added prior to culturing or acidification is that amount which permit only limited ionic interaction between the gums and dairy proteins (i.e., essentially no, or only limited, coacervation) and allows production of a non-grainy product. In certain preferred embodiments, xanthan gum is used due to its cold water solubility, consistent composition, availability, and low cost. As a result of the processes of the current invention, the final product firmness is up to about 50 percent greater than cream cheese produced without adding ionic gum before fermentation.

The present invention also provides a wheyless cream cheese or wheyless cream cheese-like product formed using a culturing or acidification step, said wheyless cream cheese or wheyless cream cheese-like product comprising of about 3 to about 12 percent dairy protein, about 4 to about 35 percent fat, about 0.001 to about 1 percent gum, and about 40 to about 80 percent water, wherein about 0.001 to about 0.1 percent of the gum is an ionic gum is added prior to the culturing or acidification step, wherein the remainder of the gum, if any, is added after the culturing or acidification step, and wherein the wheyless cream cheese or wheyless cream cheese-like product has a firmness of greater than about 1000 pascals. This represents an up to about 50 percent increase in firmness relative to a similarly prepared cream cheese prepared without the ionic gum. Preferably the firmness of the wheyless cream cheese or wheyless cream cheese-like product is about 1000 to about 5000 pascals. To obtain this increase in firmness, at least part of the gum is an ionic gum (generally about 0.001 to about 0.1 percent) added before the dairy liquid is cultured or acidified (see FIG. 1). If too much gum is added prior to the culturing or acidifying steps, undesirable and excessive coacervation between the gum and protein molecules cause numerous defects (e.g., graininess, excessive softness, and/or syneresis) in the resulting cream cheese product. If all the gum is added after the culturing or acidifying steps, a much higher gum concentration will be needed to achieve the same level of firmness; such high levels of gum generally result in undesirable texture characteristics. By adding about 0.001 to about 0.1 percent of the gum in the form of an ionic gum prior to culturing or acidification, much higher overall gum levels (with the remainder, if any, added after culturing or acidification) can be used to provide increased firmness without such quality defects.

Not intended to be limited by theory, it is postulated that the present invention takes advantage of ionic interaction between oppositely charged gum and protein molecules to form protein-dominated complex that has a greater volume than that of controls produced without ionic gum. By keeping the ionic gum concentration below the coacervation threshold level, ionic gum molecules are bound inside of the complex structure and help immobilize water. The increase in firmness though ionic gum addition provides significant productivity saving while maintaining product quality.

The current invention provides a process for making a wheyless cream cheese or wheyless cream cheese-like product, wherein the process comprises:

(1) providing a dairy mixture containing dairy proteins and fat;
(2) heating the dairy mixture to a temperature from about 120 to about 160° F. (preferably about 130 to about 150° F.) to form a first heated dairy mixture;
(3) homogenizing the first heated dairy mixture (preferably at a pressure of about 2000 to 10000 psi) to form a first homogenized dairy mixture;
(4) heating the first homogenized dairy mixture to about 165 to about 210° F. (preferably about 180 to about 205° F.) for about 15 seconds to about 20 minutes to form a second heated dairy mixture;
(5) cooling the second heated dairy mixture to a temperature of about 65 to about 80° F. (preferably about 70 to about 75° F.) to form a cooled dairy mixture;
(6) inoculating the cooled dairy mixture with a lactic ferment starter culture to form an inoculated dairy mixture;
(7) incubating the inoculated dairy mixture to reduce the pH to about 4.3 to about 5 to form a cultured dairy mixture;
(8) adjusting the pH of the cultured dairy mixture to about 4.6 to about 4.9 to form a cultured dairy blend;
(9) heating the cultured dairy blend at about 165 to about 210° F. (preferably about 180 to about 205° F.) for about 15 seconds to about 30 minutes to form a cultured dairy blend; and
(10) homogenizing (preferably at a pressure of about 100 to about 5000 psi) the heated, cultured dairy blend to form the wheyless cream cheese or wheyless cream cheese-like product;
wherein an ionic gum is added during or before the incubating step (7) in amount effective to complex with the dairy proteins but insufficient to coacervate the dairy proteins and wherein an optional stabilizer is added after the incubating step (7). Generally the wheyless cream cheese or wheyless cream cheese-like product has a firmness of greater than about 1000 pascals. Preferably the firmness of the wheyless cream cheese or wheyless cream cheese-like product is about 1000 to about 5000 pascals.

DESCRIPTION OF THE PREFERRED EMBODIMENTS

Figure 1:
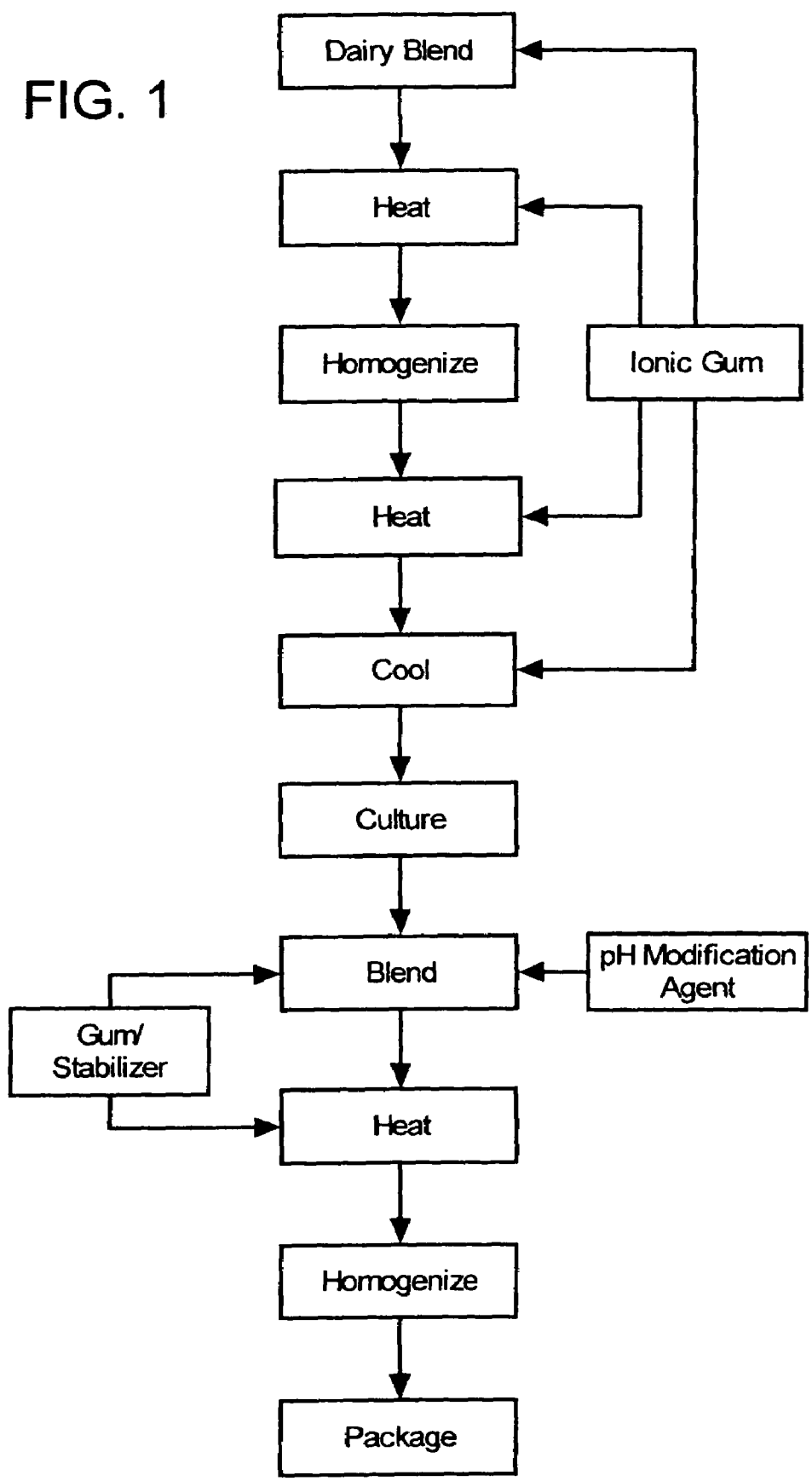
FIG. 1 provides a general flow diagram illustrating the present invention.

The current invention provides a process for making an improved wheyless cream cheese which begins by providing a dairy liquid which typically contains dairy proteins and fat. As shown in FIG. 1, the dairy liquid is heated to form a first heated dairy mixture. The first heated dairy mixture is then homogenized before being heated a second time and then cooled to form a cooled dairy mixture. A relatively small amount (generally about 0.001 to about 0.1 percent) of an ionic gum is added to the mixture prior to the culturing step. As indicated by the multiple arrows in FIG. 1, the ionic gum may be added at essentially any time prior to culturing. Additions of higher than about 0.1 percent of the ionic gum added prior to culturing or acidification should be avoided; such higher levels generally result in excessive viscosity levels making processing very difficult. The cooled dairy mixture, containing the ionic gum, is then fermented after addition of a typical cream cheese lactic fermenting bacteria to form a cultured dairy mixture. If necessary, an appropriate pH modifying agent suitable for inclusion in the product is then added to the cultured dairy mixture to adjust the final pH to about 4.6 to about 5.3 before being again heated and then homogenized to form a wheyless cream cheese. Suitable pH modifying agents include, for example, a portion of the cultured dairy mixture from step (5) (i.e., sweet mix), a liquid dairy blend comprising liquid or powdered sweet whey or sweet whey concentrate, milk powder, milk protein concentrate, or mixtures thereof. Generally, sweet mix is the preferred pH modifying agent. Of course, is the cultured dairy mixture has the desired pH (i.e., about 4.6 to about 5.3), addition of such a pH modifying agent is not required. A stabilizer, including a second gum (i.e., neutral gums, non-ionic gums, and/or ionic gums) or other types of stabilizer such as starch, can be added after culturing. As indicated by the multiple arrows in FIG. 1, the stabilizer may be added at essentially any time after to culturing or acidification.

Figure 2:
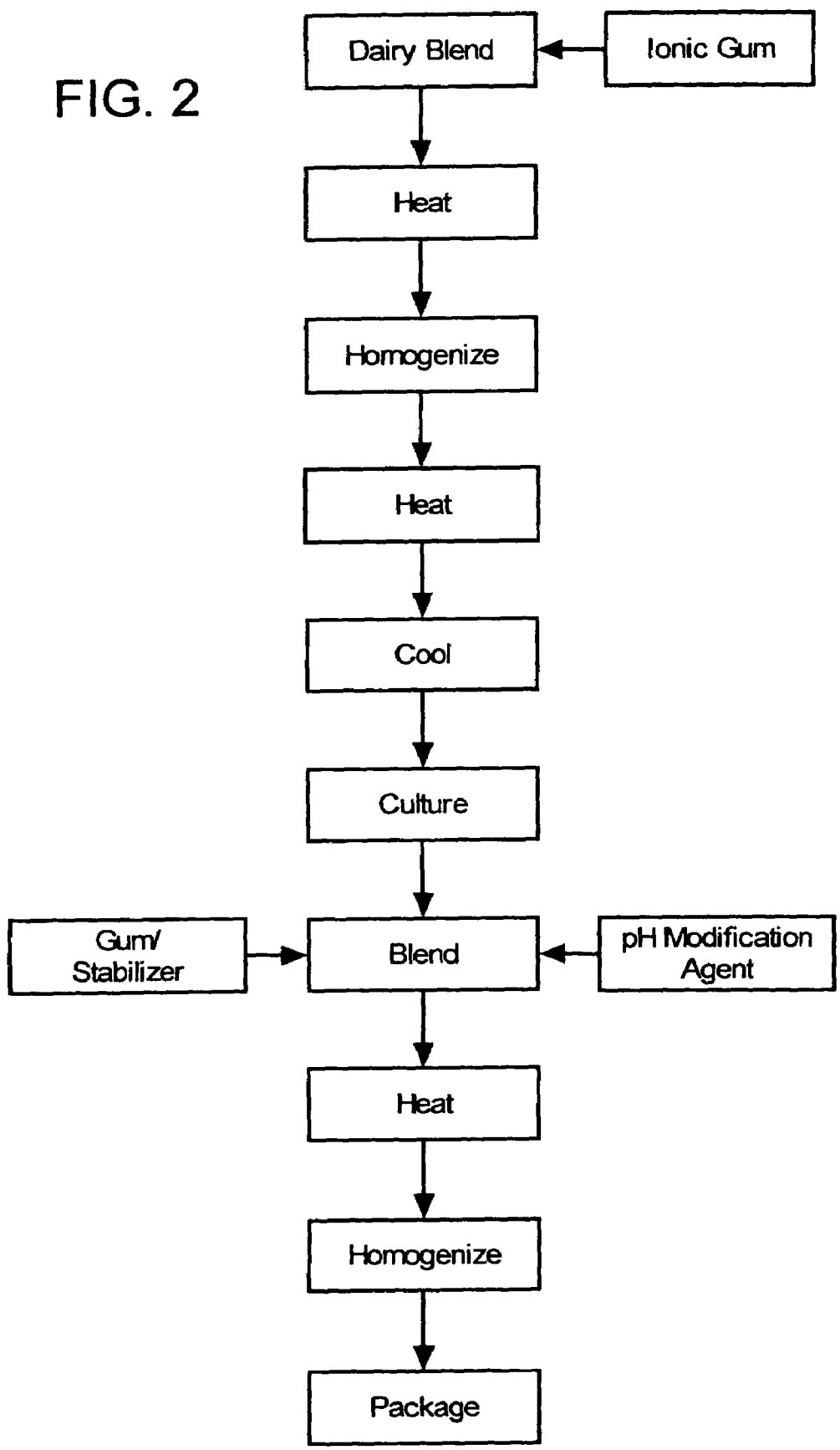
FIG. 2 provides a flow diagram for a preferred embodiment of the present invention.

In the current invention an effective amount of an ionic gum (generally about 0.001 to about 0.1 percent) is added during a first stage selected from any step before the culturing or acidification step (but preferably added during the step of preparing to the initial dairy blend; see FIG. 2), and a stabilizer, such as the second gum or mixture of such second gums, is added during a second stage selected from any step after the culturing or acidification step (but preferably before the second homogenization step (10); see FIG. 2). The stabilizers can include ionic gums (including gums the same as, or different from, the first gum or gums added prior to culturing or acidification), non-ionic gums (e.g., carob gum, tara gum, guar gum, and the like), or mixtures thereof.

The addition of a relatively small amount (generally about 0.001 to about 0.1 percent) of the ionic gum before the fermenting step results in significantly improved firmness as illustrated in the Examples. Any ionic gum known in the art can be added during the first stage, according to the current invention. Such ionic gums include, for example, xanthan, gellan, carrageenan, low methoxy pectin, and alginate. In preferred embodiments, the gum is xanthan due to its cold water solubility, consistent composition, availability, and low cost.

The effective amount of the ionic gum added during the first stage varies depending on the particular ionic gum employed. The amount of added ionic gum added should be effective at substantially controlling and substantially maximizing ionic gum-dairy product interaction while minimizing, and preferably not causing, coacervation. Typically, the concentrations range is from about 0.001 to about 0.1 percent, and more preferably from about 0.002 to about 0.05 percent. For xanthan, for example, the effective amount ranges from about 0.002 to about 0.05 percent, with about 0.005 to about 0.03 percent being preferred. As indicated above, the ionic gum may be added in the first stage addition during any of the steps preceding the fermentation step. In preferred embodiments, the ionic gum is added prior to the initial heating and homogenization steps.

The milk-based starting material for processes of the current invention is a dairy liquid containing dairy proteins. The dairy liquid, typically a mixture of dairy ingredients normally used to make cream cheese, comprises a dairy liquid or a processed dairy liquid, and normally has a butterfat content of from about 4 to about 35 percent, preferably about 10 to about 30 percent, most preferably about 11 to about 25 percent.

As used herein, "dairy liquid" refers to milk, milk products obtained by fractionation raw milk to provide a liquid fraction or a solid milk fraction that is reconstituted to a liquid, creams, and milk products obtained after curding of milk, such as whey proteins or mixtures thereof. In certain preferred embodiments the dairy liquid include a mixture of cream, milk, and whey protein concentrates. The dairy liquid of the current invention preferably has a moisture concentration of about 55 to about 80 percent, preferably about 60 to about 75 percent. The dairy liquid of the current invention preferably has a casein/whey ratio of about 90/10 to about 20/80, and preferably about 80/20 to about 30/70. The dairy liquid of the current invention may have a fat content of from about 4 to about 35 percent, and preferably about 10 to about 30 percent. The protein concentration in the dairy liquid of the current invention is preferably about 3 to about 15 percent, most preferably about 4 to about 9 percent.

The milk or milk product may be treated to remove some or all of the butterfat, providing low fat milk, skim milk, or enriched whey protein solutions, for example. Furthermore, whole milk, low fat milk, or skim milk may be concentrated by methods such as evaporation, ultrafiltration (with or without diafiltration), and the like. Evaporation provides dairy liquids containing a higher concentration of all the nonvolatile components; ultrafiltration provides dairy liquids with a higher concentration of the components that do not permeate the ultrafiltration membrane. In any case, the dairy proteins (including casein and whey protein) are retained, such that their concentrations in the resulting liquid is increased. Furthermore any of the above dairy liquids may be evaporated to dryness, providing milk or milk product solids originating from whole milk, low fat milk, skim milk and/or whey, and including casein, whey proteins, and/or lactose. Any of these solids may be reconstituted by the addition of water or a suitable aqueous composition (e.g., milk or a milk fraction). Reconstitution of dry milk thus provides dairy liquids that in general may have a broad range of final concentrations of the dairy proteins, lactose, butterfat, and other components.

All the above liquids are included in the designation of "dairy liquids" as used herein. The dairy liquids employed in the present invention may originate from any lactating livestock animal whose milk is useful as a source of human food. Such livestock animals include, by way of nonlimiting example, cows, buffalo, other ruminants, goats, sheep, and the like. Generally, however, cows' milk is the preferred dairy liquid used in the practice of the invention.

As used herein, "casein" relates to any, or all, of the phosphoproteins in milk, and to mixtures of any of them. An important characteristic of casein is that it forms micelles in naturally occurring milk and in the dairy liquids employed in the present invention. Many casein components have been identified, including, but not limited to, α-casein (including αs1-casein and αs2-casein), β-casein, κ-casein, and their genetic variants.

As used herein, "whey protein" relates to the proteins contained in the dairy liquid (i.e., whey) obtained as a supernatant of the curds when milk or a dairy liquid containing milk components are curded to produce a cheese-making curd as a semisolid. Whey protein is generally understood to include principally the globular proteins β-lactoglobulin and α-lactalbumin. It may also include significantly lower concentrations of immunoglobulin and other globulins/albumins.

As used herein a "concentrated dairy protein source" is a protein source wherein proteins are at, or can be reconstituted to be at, a concentration that is greater than the dairy liquid from which they originated. Examples of concentrated dairy protein sources include, but are not limited to, whey protein concentrate and milk protein concentrate, or combination of whey protein concentrate and milk protein concentrate. Typically, for whey protein concentrate and milk protein concentrate, protein concentrations are at least about 34 percent. Additionally, dairy protein supplements may include other sources of dairy proteins, such as whey proteins, that are not concentrated.

The fat source is typically a dairy fat source, preferably cream or butter fat. The fat source is typically added when the concentration of fat in the dairy liquid and concentrated dairy protein source, when used, is lower than desired to obtain the texture and body of cream cheese.

The current invention includes several mixing steps, before the initial heating of the dairy liquid and after culturing. The mixing steps may be carried out using any mixing device used in cheese manufacturing. For the initial mixing step, dairy liquid components are mixed together to provide an appropriate dairy mixture for an effective and relatively uniform heating step. For the mixing step after culturing, the mixture is mixed to break up curd formed during incubation and to produce a relatively homogenous slurry (i.e., the cultured dairy mixture).

The current invention includes heating steps both before and after culturing. The heating steps occur following each of the two mixing steps, referred to herein as the first heating step and the final cooking step, respectively, and optionally following the first homogenization step, referred to herein as the second heating step. The heating steps are performed using any heating apparatus that is appropriate for cheese manufacturing, many of which are well known in the art. The second heating step is optional. Inclusion of this optional second heating step is, however, preferred since it facilitates solubilization of the gums, particularly ionic gums having low cold water solubility, and has a texturizing or thickening effect.

The first heating step is typically carried out between about 120 and 160° F. for about 15 seconds to about 5 minutes in order to melt the fat. Preferably, the first heating step is carried out at a temperature of about 130 and 150° F. for about 15 seconds to about 5 minutes.

The second heating step (i.e., the optional heating step occurring after the first homogenization step) is typically carried out between about 165 and 210° F. and for about 15 seconds to about 30 minutes. Preferably, the second heating step is carried out at a temperature of between about 180 and 205° F. and for about 15 seconds to about 20 minutes.

The final heat or cooking step is effective for conditioning or texturizing (i.e., denaturing the proteins) the homogenized dairy product such that when cooled, a cream cheese product is obtained. Typically, this final texturizing or cooking step is carried out at a temperature between about 170 and 205° F. for about 15 seconds to about 30 minutes and preferably at a temperature between about 180 and 200° F. for about 5 to about 20 minutes. Any remaining lactic acid bacteria are also deactivated during this step. Undercooking generally results in a product which is too soft and unstable, whereas overcooking generally produces a undesired (e.g., grainy) texture. Using routine experimentation, the appropriate degree of cooking can easily be determined.

Homogenization is performed during two different steps of the process of the current invention, once before and once after culturing. In addition, there is a blending step just after culturing to break up any curd-like complex that may have formed during fermentation. In general, the purpose of the homogenization steps is to create and/or maintain emulsions from the various liquids of the process and to maintain the fat from the various liquids in a highly dispersed state rather than a curded state. In addition, second homogenization step assists in de-lumping, if necessary, and dispersing the gums. The homogenization can be accomplished by the use of shearing forces using conventional equipment and techniques. Typically, the dairy liquid is mixed to form a uniform substantially homogeneous mixture before proceeding to subsequent steps. Homogenization methods are well known in the food sciences. Homogenization is typically carried out at increased pressures. However, any effective homogenization method that can be used to homogenize dairy liquids can be used with the current invention. For example, but not intended to be limiting, a two-stage homogenizer may be used. Preferably, the first stage is operated at a pressure of about 2000 to about 10000 psi, preferably about 3000 to about 5000 psi, most preferably about 4500 psi, and the second stage at about 100 to about 5000 psi, preferably about 300 to about 1000 psi, preferably about 200 to 600 psi, most preferably about 500 psi.

The final homogenization (i.e., the homogenization step prior to packaging) is used to obtain the desired fat globule particle size in the final product after the final cooking step. Particle size can be monitored using convention techniques, such as, for example, a laser scattering particle size distribution analyzer, and the like. Typically, fat particles in the final cream cheese product have average diameters from about 0.75 to about 3 microns, and preferably from about 0.75 to about 1 micron. After the final homogenization the desired cream cheese is formed.

The current invention includes a fermentation step. Any lactic acid-producing bacteria used in conventional cream cheesemaking can be used in the process of the current invention. Suitable lactic acid-producing bacteria include, for example, Streptococcus or Leuconostoc such as Streptococcus lactis, Streptococcus cremoris, Streptococcus diacetyllactis, Leuconostoc cremoris, Betacoccus cremoris, and the like. These, lactic acid-producing bacteria can be used alone or in the combination thereof. Not to be limited by theory, as is known in the art, lactic acid-producing microbes are used in cheese manufacturing to ferment lactose present in the dairy liquid and to cause further decomposition of the clotted casein into smaller peptides and free amino acids as a result of the culture's production of proteases and peptidases. The lactic acid-producing culture may be added in amounts which are conventional for the present purpose (i.e., typically about 10,000 to 100,000 bacteria/g of dairy liquid). The cultures can be added as freeze-dried, frozen, or liquid cultures. If appropriate, an additional acidifying agent, such as a lactic acid solution, may be added to bring the pH within the final target range.

The fermentation (i.e., culturing) step is typically carried out until the pH of the dairy liquid is reduced to about 4.3 to about 5.0, preferably about 4.6 to about 4.9. Typically, the culturing is carried out at temperatures of between about 70 and 90° F. until the desired pH is obtained (generally between 1 and about 24 hours).

If necessary, an appropriate pH modifying agent suitable for inclusion in the product is then added to the cultured dairy mixture to adust the final pH to about 4.5 to about 4.9 before being again heated and then homogenized to form a wheyless cream cheese. Suitable pH modifying agents include, for example, a portion of the cultured dairy mixture from step (5) (i.e., sweet mix), a liquid dairy blend comprising liquid or powdered sweet whey or sweet whey concentrate, milk powder, milk protein concentrate, or mixtures thereof. Generally, sweet mix is the preferred pH modifying agent. Of course, is the cultured dairy mixture has the desired pH (i.e., about 4.5 to about 4.9), addition of such a pH modifying agent is not required.

Stabilizers, including ionic and non-ionic gums, can be added in a second stage after fermentation. Examples of stabilizers that can be used in the second stage include gums such as locust bean gum, guar gum, tara gum, xanthan gum, gum arabic, and the like; cellulose derivatives such as finely divided cellulose and carboxymethylcellulose; starch such as corn starch, rice starch, potato starch, tapioca starch, wheat starch and sweet potato starch; and modified starch such as phosphorylated starch. Generally, the level of added stabilizer is less than about 1 percent and preferably less than about 0.5 percent; within these guidelines, the current Federal Standards of Identity should be taken into account in determining the level of added stabilizer.

If desired, optional ingredients (e.g., spices, flavorants, colorants, fruits, nuts, condiments, and the like) can be added before or after the final homogenization. Generally, it is preferred to add flavorants, colorants, and like before the final homogenization so that they are dispersed homogeneously throughout the final product; condiments (e.g., chives, scallions, and the like) are preferably added after the final homogenization to maintain their integrity in the final product. For example, calcium may be added for calcium fortification. Suitable calcium sources include, for example, calcium chloride, calcium sulfate, calcium phosphate, calcium citrate, and the like. Flavorings include, for example, butter flavor, milk flavor, cheese flavor, and the like, various seasonings, fruit purees, and/or fruit powders. For the purpose of sweetening, mono and oligosaccharides such as sucrose, glucose, fructose, or maltose; sugar alcohols such as sorbitol, maltitole and lactitol; and low-calorie sweeteners such as saccharin, aspartame, stevioside, and thaumatin may be used. Colorings such as, for example, β-carotene, annatto, and the like may also be used. Such other ingredients that can be used in the process of manufacturing cream cheese according to the current invention should not, of course, interfere with the increased firmness provided by the ionic gum addition.

The final cream cheese product is packaged and cooled using conventional techniques, including both cold and hot packing techniques. The resulting cream cheese product is typically cooled and filled following the process of the current invention using conventional techniques. Preferably, after the final homogenization step, the wheyless cream cheese is cooled after it is hot filled. The temperature of filling is typically about 50 to about 70° C. Typically, the cream cheese is hot filled directly into a container (e.g., cup, tub, and the like) suitable for retail sale and then sealed.

In conventional processes for making cream cheese, whey is formed and removed. However, in the present invention, a cream cheese is produced without separation and/or removal of the whey. In accordance with the current Federal Standards of Identity, after processing, the finished cream cheese product should have a butterfat content of at least about 33 percent and a total milk solids content of at least 45 percent (corresponding to no more than 55 percent moisture). However, in the current invention, the term "cream cheese" is intended to cover cream cheese falling within the current Standards of Identity as well as cream cheese-like products falling outside the current Standards of Identity. Such cream cheese-like products prepared in accordance with the present invention have texture, body, and/or taste similar to conventionally prepared cream cheese.

In another aspect, the current invention relates to wheyless cream cheese products, produced by a process as described above, including any of the embodiments described above. The cheese products of the current invention have a number of advantages. For example, the wheyless cream cheese products of the present have the texture and body of traditional cream cheese but have significantly higher levels of whey protein as well as increased firmness.

The following examples describe and illustrate the processes and products of the invention. These examples are intended to be merely illustrative of the present invention, and not limiting thereof in either scope or spirit. Unless indicated otherwise, all percentages and ratios are by weight. Those skilled in the art will readily understand that variations of the materials, conditions, and processes described in these examples can be used.

EXAMPLE 1

Production of Wheyless Cream Cheese Using Two Stage Gum Addition

This example provides an example of the process of the present invention as illustrated generally in FIGS. 1 and 2. A cream cheese was prepared using the following procedure:

(1) A dairy liquid was prepared by mixing cream (46.2 percent), whole milk (32.8 percent), water (15.4 percent), AMP 8000 (3.94 percent; whey protein isolate from Proliant Inc., Ames, Iowa), and whey protein concentrate (WPC 34; 0.40 percent; Kraft, Inc., Northfield, Ill.) to form a final composition of 68 percent moisture, 30/70 casein/whey ratio, 22 percent fat, and 5 percent true protein;

(2) The dairy liquid was mixed in a Breddo mixer to form a first dairy mixture;

(3) Except for control samples, gum (i.e., 0.02 percent xanthan (CP-Kelcol, San Diego, Calif.), 0.01 percent GP418 (kappa-carrageenan; FMC Biopolymers, Philadelphia, Pa.), or 0.1 percent alginate (ISP Alginates Inc., San Diego, Calif.)) was added (referred to herein as "1st stage addition") to the first dairy mixture to form a supplemented first dairy mixture;

(4) The supplemented first dairy mixture was then heated to 140° F. in a jacketed, conical-shaped heating and mixing tank (CVP, Downers Grove, Ill.) to form a first heated dairy mixture;

(5) The first heated dairy mixture was then homogenized in a two-stage homogenizer (i.e., about 4500 psi in the first stage and about 500 psi in the second stage) to form a first homogenized dairy mixture;

(6) The first homogenized dairy mixture was then heated in the conical-shaped heating and mixing tank to 178° F. for 5 minutes to form a second heated dairy mixture;

(7) The second heated dairy mixture was then cooled to a temperature of about 72 to about 75° F. to form a cooled dairy mixture;

(8) The cooled dairy mixture was then inoculated with 0.1 percent of a starter culture (mixture of *Streptococcus lactis, Streptococcus cremoris, Streptococcus diacetyl-*

*lactis*, *Leuconostoc cremoris*, and *Betacoccus cremoris*) and incubated overnight at less than about 80° F. to form a cultured dairy mixture;

(9) The cultured dairy mixture was then blended for 5 minutes in a Breddo blender and sweet mix was added to adjust the pH to about 4.7 to about 4.9 to form a cultured dairy blend; the sweet mix was a portion of the cooled dairy mixture before inoculation;

(10) The cultured dairy blend was then separated into 30 lb. batches and salt, stabilizer, and/or gum (i.e., 0.2 percent tara gum (Foreign Domestic Chemicals, Oakland, N.J.) or 0.2 percent locus bean gum (LBG; Danisco Ingredients, New Century, Kans.) with or without either 0.02 percent xanthan gum (CP-Kelcol, San Diego, Calif.), or 0.02 percent GP418 (κ-carrageenan; FMC Biopolymers, Philadelphia, Pa.)) was added (referred to herein as "2nd stage addition") to form a stabilized, cultured dairy blend;

(11) The stabilized, cultured dairy blend was then heated to about 185° F. in the conical-shaped heating and mixing tank to form a cultured dairy blend;

(12) The cultured dairy blend was then homogenized in two stages (i.e., about 4500 psi in the first stage and about 500 psi in the second stage) to produce a cream cheese; and

(13) The cream cheese was then filled into 8 oz. tubs.

Moisture contents were determined using a microwave oven at an 80 percent power level. Syneresis was measured after overnight incubation at room temperature by determining the amount of moisture phase separated from the sample during the incubation period. The cheese sample in an 8 oz. cup was cut in the middle and half of the sample removed and its weight measure. After incubation the moisture phase was removed and the net change in weight was the amount of moisture separated. The rate of syneresis was determined as the net change in weight divided by the original weight of the sample after cutting. Firmness (yield stress) was measured using a Heake VT550 Viscometer equipped with a four bladed, 16×6 mm vane fixture at a speed of 0.1 rpm.

TABLE 1 indicates the ionic gums as well as the stabilizers added in the various experiments.

| Sample | Ionic Gum (first stage) | Stabilizer (second stage) |
|---|---|---|
| 1 | none | 0.2% LBG |
| 2 | none | 0.02% Xanthan & 0.2% LBG |
| 3 | none | 0.02% GP-418 & 0.2% LBG |
| 4 | 0.02% Xanthan | 0.02% Xanthan & 0.2% LBG |
| 5 | 0.02% GP418 | 0.02% GP-418 & 0.2% LBG |
| 6 | 0.01% Alginate | 0.01% Alginate & 0.2% LBG |

The results from these experiments are summarized in Table 2. Cream cheese made according to the current invention (i.e., samples 4, 5, and 6) exhibited increased firmness as compared to control samples 1, 2, and 3. The basic formulation of the cream cheese of the wheyless curd system of the current invention is 5 percent true protein (Casein/Whey 30/70), 22 percent fat, and 68 percent moisture. As shown in Table 2, yield stress (i.e., firmness) was highest for cream cheeses which were made with processes that included a first stage addition of gum. The increased yield stress was observed as shown in Table 2. Yields stress increases were most pronounced with the addition of xanthan gum in the first stage (sample 6). Syneresis, pH, and moisture levels were similar for cream cheeses prepared with the addition of gum at both a first and a second stage as those prepared by adding gum only at a second stage. Therefore, cream cheese made using the processing of the current invention is firmer than control cream cheese, yet has similar smoothness, creaminess, syneresis, pH, and moisture levels.

TABLE 2

Cream Cheese Characteristics

| No. | Yield Stress (Pa)* | Syneresis (%)** | pH | Moisture |
|---|---|---|---|---|
| 1 | 2269 | 0.58 | 4.74 | 67.9 |
| 2 | 2256 | 0.46 | 4.81 | 67.7 |
| 3 | 2384 | 0.35 | 4.76 | 67.9 |
| 4 | 3232 | 0.18 | 4.8 | 67.9 |
| 5 | 2971 | 1.35 | 4.75 | 67.8 |
| 6 | 2396 | 0.65 | 4.8 | 68.7 |

*Average of two measurements
**Percentage of liquid collected of a half of 8 oz tub sample after overnight at room temperature The examples described herein illustrate the processes and composition of the invention. These examples are intended to be merely illustrative of the present invention, and not limiting thereof in either scope or spirit. Those skilled in the art will readily understand that variations of the components, methods, steps, and devices described in these examples can be used. All references cited herein are incorporated by reference in their entirety.

What is claimed is:

1. A wheyless cream cheese or wheyless cream cheese-like product comprising of about 3 to about 15 percent dairy protein, about 4 to about 35 percent fat, about 0.01 to about 1 percent gum, and about 40 to about 80 percent water, wherein the gum is added in a first portion and a second portion, wherein the first portion consists of an ionic gum at about 0.001 to about 0.1 percent which is added prior to culturing or acidification of the wheyless cream cheese or wheyless cream cheese-like product, wherein the second portion of the gum is a stabilizer added after the culturing or acidification of the wheyless cream cheese or wheyless cream cheese-like product, wherein the wheyless cream cheese or wheyless cream cheese-like product has a firmness of greater than about 2390 pascals, wherein the firmness is greater than the firmness of the wheyless cream cheese or wheyless cream cheese-like product with the first portion of the gum not added prior to culturing or acidification and the firmness is up to about 50 percent greater than the firmness of the wheyless cream cheese or wheyless cream cheese-like product with the first portion of the gum not added prior to culturing or acidification; and wherein the first portion consisting of the ionic gum forms a complex with the dairy protein prior to culturing or acidification through an ionic interaction between a negative charge of the first portion of the ionic gum and a positive charge of the protein; and wherein the wheyless cream cheese or wheyless cream cheese-like product exhibits a syneresis of about 1.35 percent or less.

2. The wheyless cream cheese or wheyless cream cheese-like product of claim 1, wherein the ionic gum is xanthan, gellan, carrageenan, alginate, low methoxy pectin or mixtures thereof.

3. The wheyless cream cheese or wheyless cream cheese-like product of claim 2, wherein the ionic gum is xanthan.

4. The wheyless cream cheese or wheyless cream cheese-like product of claim 1, wherein the wheyless cream cheese or wheyless cream cheese-like product is prepared by a process comprising:

(1) providing a dairy mixture containing dairy proteins and fat;
(2) heating the dairy mixture to a temperature from about 120 to about 160° F. to form a first heated dairy mixture;
(3) homogenizing the first heated dairy mixture to form a first homogenized dairy mixture;
(4) heating the first homogenized dairy mixture to about 165 to about 210° F. for about 15 seconds to about 20 minutes to form a second heated dairy mixture;
(5) cooling the second heated dairy mixture to a temperature of about 65 to about 80° F. to form a cooled dairy mixture;
(6) inoculating the cooled dairy mixture with a lactic ferment starter culture to form an inoculated dairy mixture;
(7) incubating the inoculated dairy mixture to reduce the pH to about 4.3 to about 5 to form a cultured dairy mixture;
(8) adjusting the pH of the cultured dairy mixture to about 4.6 to about 5.3 to form a cultured dairy blend;
(9) heating the cultured dairy blend at about 180 to about 210° F. for about 15 seconds to about 30 minutes to form a heated, cultured dairy blend; and
(10) homogenizing the heated, cultured dairy blend to form the wheyless cream cheese or wheyless cream cheese-like product;
wherein the first portion is added during or before step (7) and the second portion is added after step (7).

5. The wheyless cream cheese or wheyless cream cheese-like product of claim 4, wherein the ionic gum is xanthan, gellan, carrageenan, alginate, low methoxy pectin, or mixtures thereof.

6. The wheyless cream cheese or wheyless cream cheese-like product of claim 5, wherein the ionic gum is xanthan.

7. The wheyless cream cheese or wheyless cream cheese-like product of claim 1, wherein the firmness is about 25 percent to about 50 percent greater than the wheyless cream cheese or wheyless cream cheese-like product without the first portion of the gum.

* * * * *

UNITED STATES PATENT AND TRADEMARK OFFICE
CERTIFICATE OF CORRECTION

PATENT NO. : 7,655,267 B2 Page 1 of 1
APPLICATION NO. : 11/053060
DATED : February 2, 2010
INVENTOR(S) : Cha et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 978 days.

Signed and Sealed this

Twenty-third Day of November, 2010

David J. Kappos
*Director of the United States Patent and Trademark Office*